(12) United States Patent
Kim et al.

(10) Patent No.: US 11,264,176 B2
(45) Date of Patent: Mar. 1, 2022

(54) MULTILAYER CERAMIC CAPACITOR

(71) Applicant: SAMSUNG ELECTRO-MECHANICS CO., LTD., Suwon-si (KR)

(72) Inventors: Tae Hoon Kim, Suwon-si (KR); Won Chul Sim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 16/849,679

(22) Filed: Apr. 15, 2020

(65) Prior Publication Data

US 2021/0210287 A1 Jul. 8, 2021

(30) Foreign Application Priority Data

Jan. 7, 2020 (KR) .................. 10-2020-0001900

(51) Int. Cl.
*H01G 4/30* (2006.01)
*H01G 2/02* (2006.01)
*H01G 4/12* (2006.01)
*H01G 4/012* (2006.01)

(52) U.S. Cl.
CPC ............ *H01G 4/30* (2013.01); *H01G 2/02* (2013.01); *H01G 4/012* (2013.01); *H01G 4/1218* (2013.01)

(58) Field of Classification Search
CPC ............ H01G 4/12; H01G 2/065; H01G 2/24; H01G 4/0085; H01G 4/012; H01G 4/20; H01G 4/2325; H01G 4/30; H01G 4/306; H01G 4/33; H01G 4/02; H01G 4/1218
See application file for complete search history.

(56) References Cited

U.S. PATENT DOCUMENTS

| 2014/0367152 A1* | 12/2014 | Lee | ............. | H05K 1/111 |
| | | | | 174/260 |
| 2014/0368968 A1* | 12/2014 | Lee | ............. | H01G 4/005 |
| | | | | 361/301.4 |
| 2015/0008024 A1 | 1/2015 | Park et al. | | |

(Continued)

FOREIGN PATENT DOCUMENTS

| EP | 2822008 A2 | 1/2015 |
| JP | 2018-098433 A | 6/2018 |

(Continued)

*Primary Examiner* — Michael P McFadden
(74) *Attorney, Agent, or Firm* — Morgan, Lewis & Bockius LLP

(57) ABSTRACT

A multilayer ceramic capacitor includes a ceramic body including a dielectric layer and first and second internal electrodes stacked with the dielectric layer interposed therebetween, and having first and second external electrodes disposed on the ceramic body and connected to the first and second internal electrodes, respectively. The first external electrode includes a first electrode portion and a first band portion, and the second external electrode comprises a second electrode portion and a second band portion. A length of the ceramic body in a first direction is L, a width thereof in a second direction is W, a length of the first and second electrode portions in the first direction is BW, a width of the first or second band portion in the second direction is SW, a ratio SW/W is less than 0.46, and a ratio BW/L exceeds 0.10.

17 Claims, 5 Drawing Sheets

(56) References Cited

U.S. PATENT DOCUMENTS

| | | | | |
|---|---|---|---|---|
| 2015/0114705 | A1* | 4/2015 | Ahn | ........................ H01G 4/248 |
| | | | | 174/260 |
| 2018/0020545 | A1* | 1/2018 | Ahn | ........................ H01G 4/018 |
| 2018/0174754 | A1 | 6/2018 | Kitamura et al. | |

FOREIGN PATENT DOCUMENTS

| KR | 10-2014-0145831 A | 12/2014 |
|---|---|---|
| KR | 10-1477405 B1 | 12/2014 |

* cited by examiner

I-I'

II-II'

MULTILAYER CERAMIC CAPACITOR

CROSS-REFERENCE TO RELATED APPLICATION(S)

This application claims benefit of priority to Korean Patent Application No. 10-2020-0001900 filed on Jan. 7, 2020 in the Korean Intellectual Property Office, the disclosure of which is incorporated herein by reference in its entirety.

BACKGROUND

1. Field

The present disclosure relates to a multilayer ceramic capacitor.

2. Description of Related Art

Recently, the use of electronic devices using multilayer ceramic capacitors (MLCC) has increased rapidly. In particular, in the case of smartphones, the 5G era has arrived, and the number of capacitors has increased, such that high-capacity is required. On the other hand, due to the miniaturization of set products, amounting area of passive devices such as MLCCs and inductors is being reduced, and accordingly, miniaturization and thinning of passive devices are increasingly required. Accordingly, a method of packaging multilayer ceramic capacitors and inductors with ICs and APs, embedding them inside substrates, or mounting them in LSC types at a bottom of APs has been proposed to increase a degree of freedom in mounting.

As described above, demand for thinner multilayer ceramic capacitor products is increasing because it is effective not only in reducing a mounting area but also in reducing ESL occurring in the substrate.

Meanwhile, since dielectric materials, the main materials of capacitors, have piezoelectric properties, they are deformed in synchronization with an applied voltage. When a period of the applied voltage is within an audible frequency band, displacement becomes vibrations and is transmitted to the substrate through a solder, and the substrate vibration is experienced as sound, known as acoustic noise. The acoustic noise may affect voice output or may cause malfunctions in various sensors used in IT and industrial and/or electric fields.

Therefore, product design is required to reduce acoustic noise. For low profile capacitors with very low thicknesses, such as embedded capacitors, surface-mount capacitors, and the like, there is a limitation in lowering a height thereof, such that a new method, instead of the existing noise reduction method, has been tried. However, when reducing noise by adjusting a position of the external electrode, there is a problem that adhesive strength due to the reduction of a bonding area may be weak.

SUMMARY

An aspect of the present disclosure is to provide a multilayer ceramic capacitor capable of reducing acoustic noise.

Another aspect of the present disclosure is to provide a multilayer ceramic capacitor having excellent adhesive strength when mounted on a substrate.

Another aspect of the present disclosure is to provide a multilayer ceramic capacitor having reduced equivalent series inductance (ESL).

According to an aspect of the present disclosure, a multilayer ceramic capacitor includes a ceramic body having a dielectric layer and first and second internal electrodes disposed to be stacked in a third direction with the dielectric layer interposed therebetween, and having fifth and sixth surfaces opposed in a first direction, third and fourth surfaces opposed in a second direction, and first and second surfaces opposed in the third diction. First and second external electrodes are disposed on the third and fourth surfaces of the ceramic body, respectively, and connected to the first and second internal electrodes, respectively. The first external electrode includes a first electrode portion disposed on the third surface of the ceramic body and a first band portion extending onto the first and second surfaces of the ceramic body, and the second external electrode includes a second electrode portion disposed on the fourth surface of the ceramic body and a second band portion extending onto the first and second surfaces of the ceramic body. A length of the ceramic body in the first direction is L, a width thereof in the second direction is W, a length of the first and second electrode portions in the first direction is BW, a width of the first and second band portions in the second direction is SW, a ratio SW/W is less than 0.46, and a ratio BW/L exceeds 0.10.

According to another aspect of the present disclosure, a multilayer ceramic capacitor includes a ceramic body having a plurality of first internal electrodes and a plurality of second internal electrodes that are alternately stacked in a third direction with dielectric layers disposed therebetween. The ceramic body has a length L in a first direction orthogonal to the third direction greater than a width W thereof in a second direction orthogonal to the first and third directions, and the first and second internal electrodes are each respectively exposed to third and fourth surfaces opposite each other in the second direction. First and second external electrodes are respectively disposed on the third and fourth surfaces to respectively connect to the plurality of first internal electrodes and to the plurality of second internal electrodes. The first external electrode includes a first electrode portion disposed on the third surface of the ceramic body and a first band portion extending onto at least one of the first and second surfaces of the ceramic body opposite each other in the third direction, and the second external electrode includes a second electrode portion disposed on the fourth surface of the ceramic body and a second band portion extending onto at least one of the first and second surfaces of the ceramic body. A width of the first or second band portion in the second direction is SW, and a ratio SW/W exceeds 0.11 and is less than 0.46.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
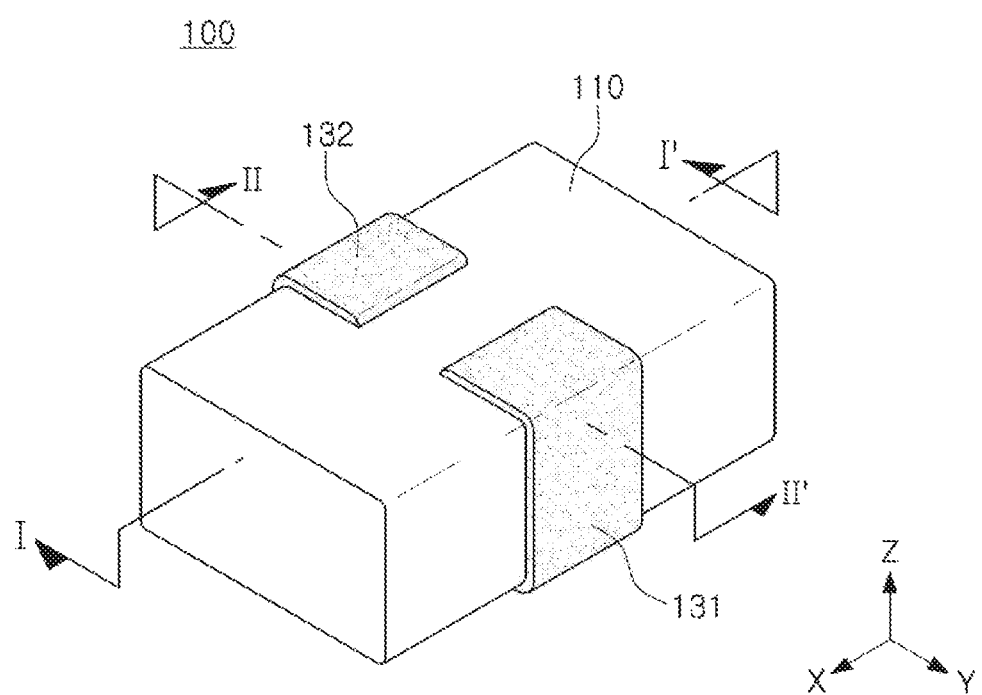
FIG. 1 is a perspective view illustrating a multilayer ceramic capacitor according to an exemplary embodiment of the present disclosure.

Hereinafter, embodiments of the present disclosure will be described as follows with reference to the attached drawings. The disclosure and drawings are not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction, or a length direction; a Y direction may be defined as a second direction, a W direction, or a width direction; and a Z direction may be defined as a third direction, a T direction, or a thickness direction.

Figure 2:
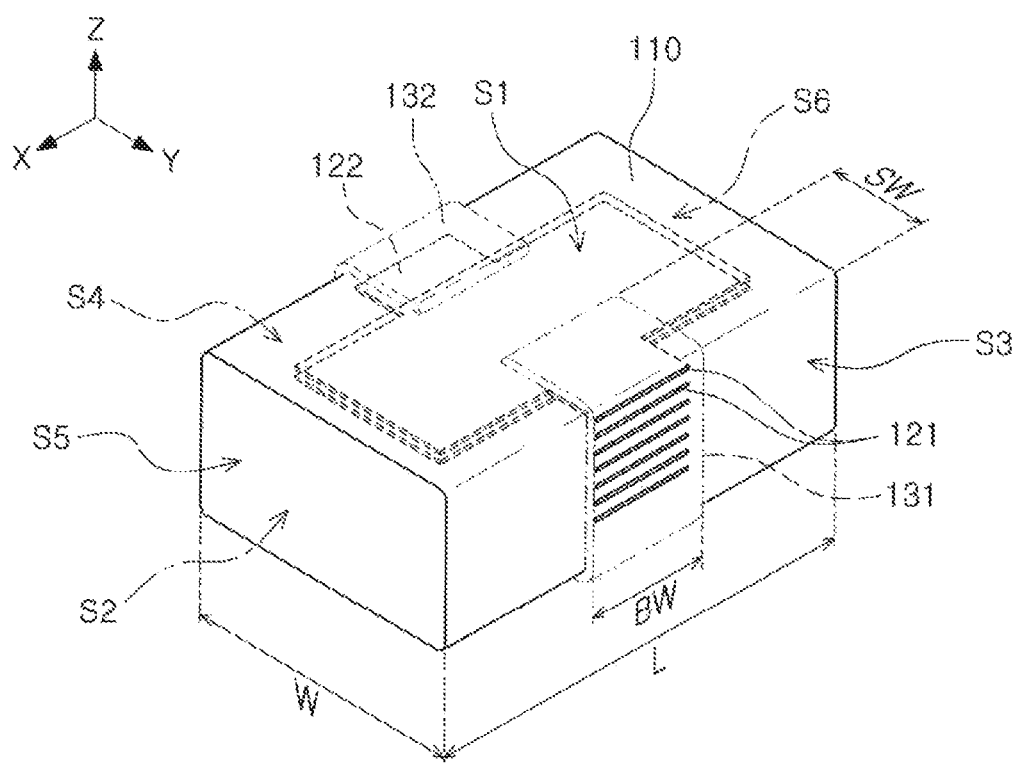
FIG. 2 is a perspective view illustrating the ceramic body of FIG. 1 with semi-transparent elements.
Figure 3:
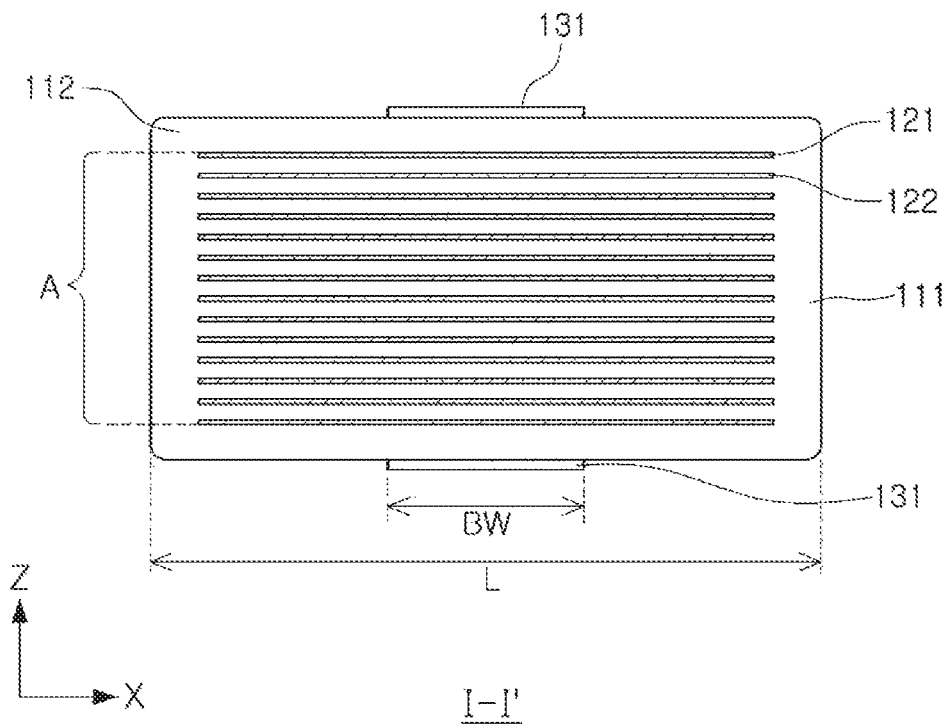
FIG. 3 is a cross-sectional view taken along line I-I' of FIG. 1.
Figure 4:
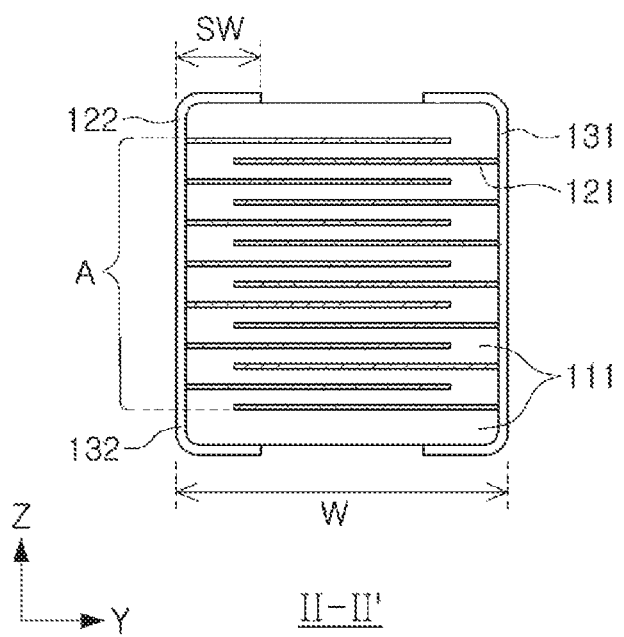
FIG. 4 is a cross-sectional view taken along line II-II' of FIG. 1.

FIG. 1 is a schematic perspective view of a multilayer ceramic capacitor according to an embodiment of the present disclosure, and FIG. 2 is a schematic perspective view illustrating the ceramic body of FIG. 1 with semi-transparent elements. In addition, FIGS. 3 and 4 are cross-sectional views along the I-I' and II-II' surfaces of FIG. 1, respectively.

Referring to FIGS. 1 to 4, a multilayer ceramic capacitor 100 according to an embodiment of the present disclosure may include a ceramic body 110 including a dielectric layer 111 and first and second internal electrodes 121 and 122 disposed to be stacked in a third direction (Z direction) with the dielectric layer 111 interposed therebetween, and having fifth and sixth surfaces S5 and S6 opposed in a first direction (X direction), third and fourth surfaces S3 and S4 opposed in a second direction (Y direction), and first and second surfaces S1 and S2 opposed in the third direction (Z direction). First and second external electrodes 131 and 132 are disposed on the third surface S3 and the fourth surface S4 of the ceramic body 110, respectively, and connected to the first and second internal electrodes 121 and 122, respectively. The first external electrode 131 may include a first electrode portion disposed on the third surface S3 of the ceramic body 110 and a first band portion extending onto the first surface S1 and the second surface S2 of the ceramic body 110, and the second external electrode 132 may include a second electrode portion disposed on the fourth surface S4 of the ceramic body 110 and a second band portion extending onto the first surface S1 and the second surface S2 of the ceramic body 110.

In this case, when a length of the ceramic body 110 in a first direction (X direction) is L, a width thereof in a second direction (Y direction) is W, a length of the first and second electrode portions in the first direction (X direction) is BW, a width of the first or second band portion in the second direction (Y direction) is SW, when SW/W is less than 0.46, BW/L may exceed 0.10. When the ranges of the SW/W and the BW/L are satisfied, adhesive strength to the substrate may be improved while reducing acoustic noise.

In the present specification, the width of the ceramic body 110 in the second direction (Y direction) may mean a shortest distance between the third surface S3 and the fourth surface S4 of the ceramic body 110, and in the present specification, the length of the ceramic body 110 in the first direction (X direction) may mean a shortest length between the fifth surface S5 and the sixth surface S6 of the ceramic body 110.

In an embodiment of the present disclosure, the ceramic body 110 may include an active portion A including dielectric layer(s) 111 and first and second internal electrodes 121 and 122 disposed to be stacked in a third direction (Z direction) with the dielectric layer(s) 111 interposed therebetween.

Although a specific shape of the ceramic body 110 is not particularly limited, as shown, the ceramic body 110 may be formed to have a hexahedral shape or a shape similar thereto. Due to shrinkage of ceramic powder contained in the ceramic body 110 during a firing process, the ceramic body 110 may have a substantially hexahedral shape, although the hexahedral shape may not have perfectly straight lines or edges. The ceramic body 110 may have fifth and sixth surfaces S5 and S6 opposing each other in a length direction (X direction), third and fourth surfaces S3 and S4 connected to the fifth and sixth surfaces S5 and S6 and opposing each other in a width direction (Y direction), and first and second surfaces S1 and S2 connected to the fifth and sixth surfaces S5 and S6, connected to the third and fourth surfaces S3 and S4 and opposing each other in a thickness direction (Z direction).

The ceramic body 110 may be formed by alternately stacking ceramic green sheet(s) on which a first internal electrode 121 is printed on the dielectric layer 111 and ceramic green sheet(s) on which a second internal electrode 122 is printed on the dielectric layer 111 in a thickness direction (the Z direction).

The active portion A may be formed such that dielectric layers 111 and internal electrodes 121 and 122 are alternately stacked in a third direction (Z direction). A plurality of dielectric layers 111 forming the active portion A may be in a sintered state, and boundaries between adjacent dielectric layers 111 may be integrated such that they may be difficult to confirm without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used.

In addition, a variety of ceramic additives, organic solvents, plasticizers, binders, dispersants, and the like may be added to powder particles such as barium titanate ($BaTiO_3$), and the like, depending on the purpose of the present disclosure.

For example, the dielectric layer 111 may be formed by applying and drying a slurry formed by including powder such as barium titanate ($BaTiO_3$) on a carrier film to prepare a plurality of ceramic sheets. The ceramic sheet may be formed by mixing ceramic powder, a binder, and a solvent to prepare a slurry, and manufacturing the slurry into a sheet having a thickness of several μms by a doctor blade method, but is not limited thereto.

In a multilayer ceramic capacitor of the present disclosure, a plurality of internal electrodes 121 and 122 may be disposed to oppose or overlap each other with the dielectric layer(s) 111 interposed therebetween. The internal electrodes 121 and 122 may include first and second internal electrodes 121 and 122 alternately disposed to oppose or overlap each other with the dielectric layer (s) 111 interposed therebetween.

The first and second internal electrodes 121 and 122 may be disposed to be spaced apart from the fifth and sixth surfaces S5 and S6 of the ceramic body 110 by a predetermined distance. A distance from which the first internal electrode 121 and the second internal electrode 122 are spaced apart from the fifth surface S5 and the sixth surface S6 of the ceramic body 110 is not particularly limited if the first and second internal electrodes 121 and 122 are not exposed outside of the ceramic body 110, but may be disposed to be spaced apart by more than 1 μm. The fifth and sixth surfaces S5 and S6 of the ceramic body 110 may be two surfaces of the ceramic body 110 opposed in a first direction (X direction), and the first and second internal electrodes 121 and 122 may be disposed to be spaced apart from the fifth and sixth surfaces S5 and S6 by a predetermined distance, which may mean that it may have a structure that the first and second internal electrodes 121 and 122 are not led-out in the length direction through the fifth and sixth surfaces S5 and S6 of the ceramic body 110.

In an example of the present disclosure, the first internal electrode(s) 121 may be exposed to one surface S3 of the ceramic body 110 in the second direction (Y direction), and a portion exposed to the one surface S3 in the second direction (Y direction) may be connected to the first external electrode 131. The second internal electrode (s) 122 may be exposed to the other surface S4 of the ceramic body 110 opposite the one surface S3 in the second direction (Y direction), and a portion exposed to the other surface S4 thereof in the second direction (Y direction) may be connected to the second external electrode 132. The first and second internal electrodes 121 and 122 may be electrically separated from each other by the dielectric layer(s) 111 disposed in a middle.

The first internal electrode 121 and the second internal electrode 122 may be respectively exposed to the third surface S3 and the fourth surface S4 of the ceramic body, such that a reverse geometry capacitor (RGC), or a low inductance chip capacitor (LICC), can be implemented as described below.

In an embodiment of the present disclosure, the first and second internal electrodes 121 and 122 may each include a capacitance portion overlapping with a neighboring internal electrode to contribute capacitance formation, and a lead-out portion in which a portion of the internal electrode is extended from the capacitance portion to be led-out to outside of the ceramic body. The lead-out portion may serve to connect the internal electrode and the external electrode, and may be positioned on the same plane as the capacitance portion of the respective first internal electrode 121 or the second internal electrode 122.

When the first and second internal electrodes 121 and 122 each include a capacitance portion and a lead-out portion, the lead-out portion of the first internal electrode 121 may be exposed to one surface S3 of the ceramic body 110 in the second direction (Y direction), and the lead-out portion of the second internal electrode 122 may be exposed to another surface S4 of the ceramic body 110 opposite to the one surface S3 in the second direction (Y direction). In this case, the lead-out portions of the first and second internal electrodes 121 and 122 may be connected to the first external electrode 131 and the second external electrode 132, respectively.

In one example, the capacitance portions of the first and second internal electrodes 121 and 122 of the multilayer ceramic capacitor 100 of the present disclosure may have a point-symmetric shape with respect to a central axis of the ceramic body 110 extending in the third direction (Z direction). The central axis of the ceramic body 110 in the third direction (Z direction) may be a line, perpendicular to the first surface S1 or the second surface S2 of the ceramic body 110, and passing through the center of the ceramic body 110. As described above, when the first and second internal electrodes 121 and 122 are disposed to be spaced apart from the fifth and sixth surfaces S5 and S6 of the ceramic body 110 by a predetermined distance, and the lead-out portions of the first and second internal electrodes 121 and 122 are respectively exposed to the surfaces S3 and S4 of the ceramic body 110 opposite each other in the second direction (Y direction), and at the same time, the capacitance portions of the internal electrodes 121 and 122 have a point symmetrical shape with respect to a central axis of the ceramic body 110 in the third direction (Z direction), the capacitance portions of the first and second internal electrodes 121 and 122 may be disposed to be spaced apart by a predetermined distance from the third surface S3, the fourth surface S4, the fifth surface S5, and the sixth surface S6 of the ceramic body 110.

The lead-out portion is not particularly limited, but, for example, may have a shorter length in the first direction (X direction) than a length in the first direction (X direction) of an internal electrode constituting the capacitance portion. The length of the lead-out portion may be equal to BW, which is a length of the first and second electrode portions described above, or shorter than BW.

A material for forming the first and second internal electrodes 121 and 122 is not particularly limited. For example, the first and second internal electrodes 121 and 122 may be formed by using a conductive paste containing one or more materials of silver (Ag), palladium (Pd), gold (Au), platinum (Pt), nickel (Ni), copper (Cu), tin (Sn), tungsten (W), titanium (Ti), and alloys thereof. As a printing method of the conductive paste, a screen printing method, a gravure method, or the like may be used, but the present disclosure is not limited thereto.

In the multilayer ceramic capacitor according to the present disclosure, a margin portion may be disposed on both surfaces of the active portion A in the first direction (X direction) and the second direction (Y direction). The margin portion may be disposed on both surfaces of the active portion A in the first direction (X direction) and the second direction (Y direction), perpendicular to a third direction (Z direction). In this case, as described above, lead-out portions of the first internal electrode 121 and the second internal electrode 122 may be respectively led-out to opposing surfaces of the ceramic body 110 in the second direction (Y direction), and respectively connected to the first and second external electrodes 131 and 132. That is, each lead-out portion may be disposed to penetrate a respective margin portion. The margin portions may serve to prevent damages to the internal electrodes due to physical or chemical stresses.

The margin portions may be made of an insulating material, and may be made of a ceramic material such as barium titanate, or the like. In this case, the margin portions may include the same ceramic material as that included in the dielectric layer 111, or may be made of the same material as the dielectric layer 111. A method for forming the margin portions is not particularly limited. For example, an area of each dielectric layer may be formed to be greater than an area of the internal electrode, so as to form a margin area in a remaining circumferential portion of the dielectric layer outside of the portion having the internal electrode thereon, or it may be formed by applying a slurry containing ceramic or attaching a dielectric sheet to both surfaces of the active portion in a second direction (the Y direction).

Figure 5:
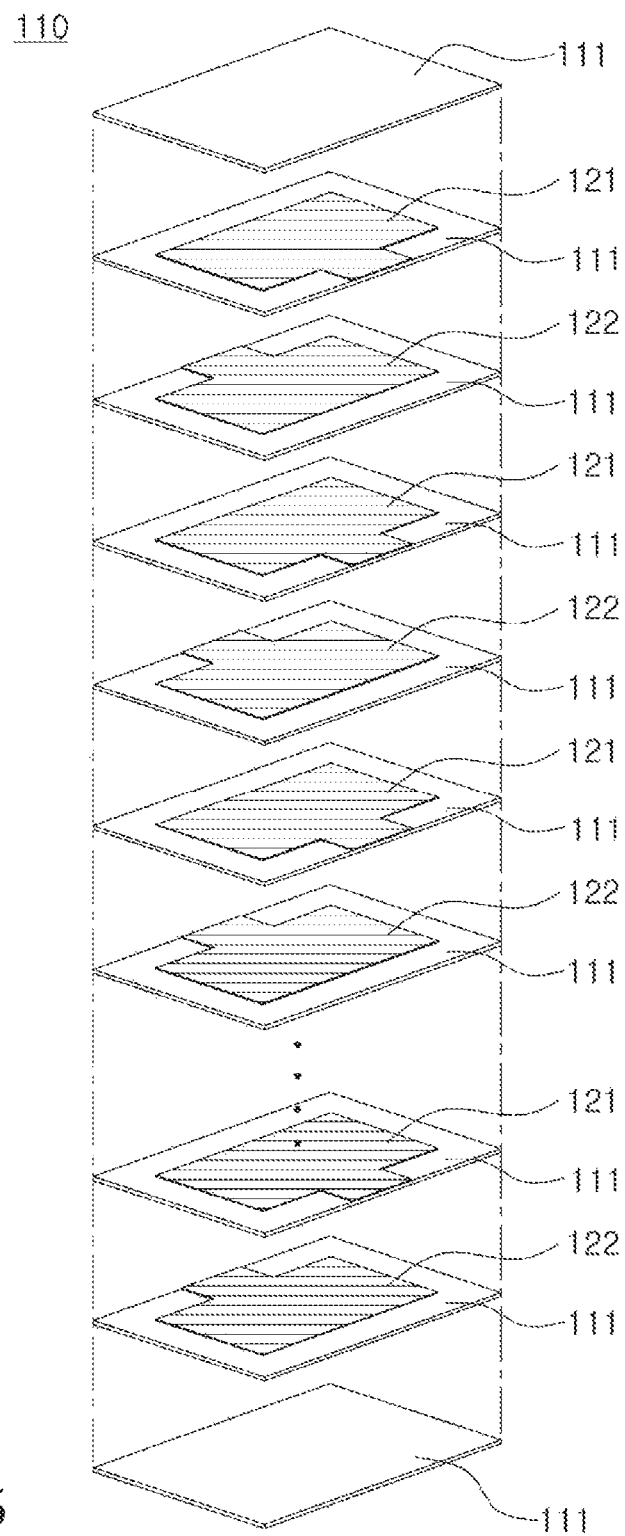
FIG. 5 is an exploded perspective view of the ceramic body of FIG. 2.
Figure 6:
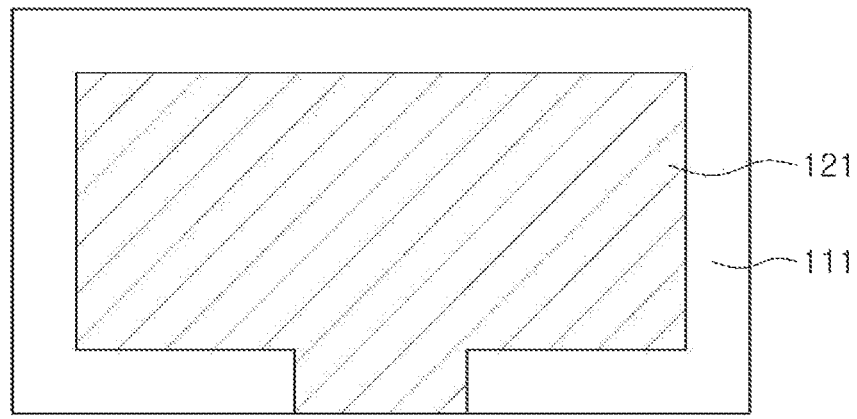
FIGS. 6 and 7 are plan views of internal electrodes of a multilayer ceramic capacitor according to an embodiment of the present disclosure.
Figure 7:
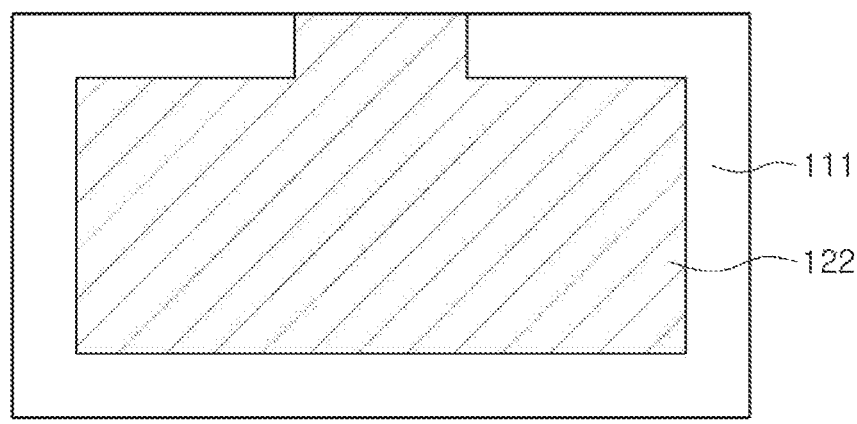

The multilayer ceramic capacitor 100 according to the present disclosure may include a cover portion 112. FIG. 5 is an exploded view of the ceramic body 110 of the multilayer ceramic capacitor 100 of the present disclosure. Referring to FIG. 5, the cover portion 112 may be disposed at an outermost portion of the first and second internal electrodes 121 and 122. The cover portion may be disposed below a lowermost internal electrode and above an uppermost internal electrode of the ceramic body 110. In this case, the cover portion may be formed of the same composition as the dielectric layer 111, and the cover portion may be formed by stacking at least one or more dielectric layers that do not include an internal electrode above the uppermost internal electrode and below the lowermost internal electrode of the ceramic body 110, respectively. The cover portion may basically serve to prevent damage to the internal electrodes due to physical or chemical stresses.

In an example of the present disclosure, a first external electrode 131 of a multilayer ceramic capacitor 100 according to the present disclosure may include a first electrode portion disposed on the third surface S3 of the ceramic body 110 and a first band portion extending onto the first surface S1 and the second surface S2 of the ceramic body. In addition, the second external electrode 132 may include a second electrode portion disposed on the fourth surface S4 of the ceramic body 110 and a second band portion extending onto the first surface S1 and second surface S2 of the ceramic body 110.

In general multilayer ceramic capacitors, external electrodes may be disposed in cross-sections facing each other in the length direction of the ceramic body. In this case, since a current path is long when AC is applied to the external electrodes, a current loop may be formed larger, and an inductance may increase due to a size of an induced magnetic field. In order to solve the above-described problem, in order to reduce the path of the current according to an embodiment of the present disclosure, first and second external electrodes 131 and 132 may be disposed on both surfaces S3 and S4 facing each other in the second direction (the Y direction and the width direction) of the ceramic body 110. In this case, since a length between the first and second external electrodes 131 and 132 is small, the current path may be small, thereby reducing the current loop and thus reducing the inductance.

In an example of the present disclosure, when a length of the multilayer ceramic capacitor 100 according to the present disclosure in a first direction (X direction) is L, a width thereof in a second direction (Y direction) is W, a length of the first and second electrode portions in the first direction (X direction) is BW, a width of the first or second band portion in the second direction (Y direction) is SW, when SW/W exceeds 0.11, BW/L may be less than 0.90. When the above range is satisfied, it is possible to improve the adhesive strength when mounted on a substrate while reducing the noise.

In another example of the present disclosure, BW/L may be in a range of exceeding 0.10 and less than 0.90. When the BW/L is increased, a contact area of a solder filter formed in the electrode portion of the multilayer ceramic capacitor may be increased when mounting the substrate, thereby increasing the adhesive strength between the multilayer ceramic capacitor and the substrate according to the present disclosure.

In another example of the present disclosure, SW/W may be in a range of exceeding 0.11 and less than 0.46. When the SW is increased, a contact area between the solder and a lower surface of the band portion of the multilayer ceramic capacitor may be maximized when being mounted on a substrate, thereby increasing the adhesive strength between the multilayer ceramic capacitor and the substrate. When the SW/W becomes too high, a short circuit may occur at the first external electrode and the second external electrode.

In another example of the present disclosure, the first band portion of the first external electrode and the second band portion of the second external electrode may be disposed to be spaced apart from each other by 0.08 W or more. An upper limit of a distance between the first band portion and the second band portion is not particularly limited, but may be, for example, 0.45 W or less. The first band portion and the second band portion may be disposed to be spaced apart from each other at the above-described range distance, thereby preventing a failure of the multilayer ceramic capacitor.

In an embodiment of the present disclosure, a width W in the second direction between the third and fourth surfaces of the ceramic body 110 in which the first external electrode 131 and the second external electrode 132 of the multilayer ceramic capacitor 100 according to the present disclosure are formed, respectively, may be smaller or equal to the length L in the first direction X of the ceramic body 110. As a result, since a distance between the first and second external electrodes 131 and 132 is reduced (e.g., equal to or smaller than a length L of the ceramic body 110), a current path may be reduced, thereby reducing a current loop and thus reducing the inductance. As such, the first and second external electrodes 131 and 132 may be formed on the third and fourth surfaces S3 and S4 of the ceramic body 110, such that a multilayer ceramic capacitor in which the width W of the ceramic body 110 is shorter than or equal to the length L of the ceramic body 100 may be referred to as a reverse geometry capacitor (RGC) or a low inductance chip capacitor (LICC).

The first and second external electrodes 131 and 132 respectively connected to the first and second internal electrodes 121 and 122 of the multilayer ceramic capacitor 100 according to the present disclosure may be firing electrodes containing a conductive metal. As a conductive metal contained in the first external electrode 131 and the second external electrode 132, various metals having excellent contact with the internal electrode may be applied including, for example, one or more conductive metals of copper (Cu), nickel (Ni), tin (Sn), palladium (Pd), platinum (Pt), iron (Fe), gold (Au), silver (Ag), tungsten (W), titanium (Ti), lead (Pb), and/or alloys thereof, but is not limited thereto.

In addition, the first external electrode 131 and the second external electrode 132 may further include a glass component. The glass component may be a composition in which oxides are mixed, and may not be particularly limited, but may be one or more selected from a group consisting of a silicon oxide, a boron oxide, an aluminum oxide, a transition metal oxide, an alkali metal oxide, and an alkaline earth metal oxide. The transition metal may be selected from a group consisting of zinc (Zn), titanium (Ti), copper (Cu), vanadium (V), manganese (Mn), iron (Fe), and nickel (Ni). The alkali metal may be selected from a group consisting of lithium (Li), sodium (Na) and potassium (K). The alkaline earth metal may be one or more selected from a group consisting of magnesium (Mg), calcium (Ca), strontium (Sr), and barium (Ba).

A method of forming the first external electrode 131 and the second external electrode 132 is not particularly limited. For example, various methods may be used including printing or coating a conductive paste containing a conductive metal on a surface of the ceramic body 110 by a screen-printing method, a gravure printing method, or the like, dipping the ceramic body 110 in the conductive paste, or transferring and forming a dry film drying the conductive paste on the ceramic body 110, but the disclosure is not limited to these methods.

Table 1 below shows an experimental example measuring an adhesion strength between a multilayer ceramic capacitor and a substrate as the BW/L and SW/W ratios are changed, for a multilayer ceramic capacitor having a LICC structure in which first and second external electrodes are formed on third and fourth surfaces of a 1005 size ceramic body, respectively. As the substrate, a commercially available general substrate was used, and the strength of force that was applied to separate the multilayer ceramic capacitor from the substrate when a stress was applied after soldering to the multilayer ceramic capacitor according to the present disclosure to a copper-plated terminal electrode was evaluated as adhesive strength. Referring to Table 1, it can be confirmed that a certain relationship is established between BW/L and SW/W. When the BW/L is 0.10, SW/W should exceed 0.46 such that the adhesive strength exceeds 5 N, and when BW/L is 0.90, the adhesive strength of 5 N or more is satisfied in a range that SW/W is 0.11 or more.

TABLE 1

| SW/W | BW/L = 0.05 | BW/L = 0.10 | BW/L = 0.30 | BW/L = 0.50 | BW/L = 0.70 | BW/L = 0.90 |
|---|---|---|---|---|---|---|
| 0.07 | 2.11 | 2.17 | 2.17 | 2.17 | 3.19 | 4.98 |
| 0.11 | 2.17 | 2.23 | 2.37 | 4.71 | 4.78 | 5.71 |
| 0.14 | 2.71 | 2.55 | 2.71 | 5.11 | 5.27 | 5.88 |
| 0.18 | 2.91 | 2.67 | 3.31 | 5.31 | 5.33 | 6.31 |
| 0.21 | 3.19 | 3.17 | 3.37 | 5.29 | 5.67 | 6.71 |
| 0.25 | 3.24 | 3.37 | 3.71 | 5.66 | 5.69 | 6.99 |
| 0.29 | 3.71 | 3.55 | 3.91 | 6.17 | 5.96 | 7.17 |
| 0.32 | 3.99 | 3.96 | 4.17 | 7.51 | 6.17 | 7.37 |
| 0.36 | 4.14 | 3.94 | 4.55 | 8.31 | 6.47 | 7.97 |
| 0.39 | 4.17 | 4.11 | 4.89 | 8.69 | 7.78 | 9.37 |
| 0.43 | 4.39 | 4.51 | 5.11 | 9.17 | 8.37 | 10.17 |
| 0.46 | 4.71 | 5.17 | 5.37 | 9.33 | 9.39 | 10.36 |

As set forth above, according to an embodiment of the present disclosure, a multilayer ceramic capacitor capable of reducing acoustic noise may be provided.

According to another embodiment of the present disclosure, a multilayer ceramic capacitor having excellent adhesive strength when being mounted on a substrate may be provided.

According to another embodiment of the present disclosure, a multilayer ceramic capacitor having reduced equivalent series inductance (ESL) may be provided.

However, various and advantageous advantages and effects of the present disclosure are not limited to the above description, and will be more readily understood in the process of describing specific embodiments of the present disclosure.

While the example embodiments have been shown and described above, it will be apparent to those skilled in the art that modifications and variations could be made without departing from the scope of the present invention as defined by the appended claims.

What is claimed is:

1. A multilayer ceramic capacitor, comprising:
a ceramic body including a dielectric layer and first and second internal electrodes disposed to be stacked in a third direction with the dielectric layer interposed therebetween, and having fifth and sixth surfaces opposed in a first direction, third and fourth surfaces opposed in a second direction, and first and second surfaces opposed in the third direction; and
first and second external electrodes disposed on the third and fourth surfaces of the ceramic body, respectively, and connected to the first and second internal electrodes, respectively,
wherein the first external electrode comprises a first electrode portion disposed on the third surface of the ceramic body and a first band portion extending onto the first and second surfaces of the ceramic body,
the second external electrode comprises a second electrode portion disposed on the fourth surface of the ceramic body and a second band portion extending onto the first and second surfaces of the ceramic body, and
when a length of the ceramic body in the first direction is L, a width thereof in the second direction is W, a length of the first and second electrode portions in the first direction is BW, and a width of the first or second band portion in the second direction is SW, a ratio SW/W is less than 0.46 and a ratio BW/L exceeds 0.10 and is less than 1.00.

2. The multilayer ceramic capacitor of claim 1, wherein the ratio SW/W exceeds 0.11 and the ratio BW/L is less than 0.90.

3. The multilayer ceramic capacitor of claim 1, wherein the ratio BW/L is in a range exceeding 0.10 and less than 0.90.

4. The multilayer ceramic capacitor of claim 1, wherein the ratio SW/W exceeds 0.11 and is less than 0.46.

5. The multilayer ceramic capacitor of claim 1, wherein each of the first and second internal electrodes comprises a capacitance portion overlapping with a neighboring internal electrode to contribute to capacitance formation and a lead-out portion extending from the capacitance portion to be led-out to an outside of the ceramic body.

6. The multilayer ceramic capacitor of claim 5, wherein the capacitance portions of the first and second internal electrodes have a point-symmetrical shape with respect to a central axis extending in the third direction of the ceramic body.

7. The multilayer ceramic capacitor of claim 5, wherein the lead-out portion of the first internal electrode is led-out to the third surface of the ceramic body, and
the lead-out portion of the second internal electrode is led-out to the fourth surface of the ceramic body.

8. The multilayer ceramic capacitor of claim 1, wherein the first and second internal electrodes are disposed to be spaced apart from each of the fifth and sixth surfaces of the ceramic body.

9. The multilayer ceramic capacitor of claim 1, wherein the ceramic body comprises an active portion in which the first and second internal electrodes overlap with each other to form capacitance and a cover portion disposed on upper and lower surfaces of the active portion opposed in the third direction.

10. The multilayer ceramic capacitor of claim 1, wherein the first and second band portions are disposed to be spaced apart from each other by 0.08 W or more.

11. The multilayer ceramic capacitor of claim 1, wherein the width W of the ceramic body in the second direction is less than or equal to the length L of the ceramic body in the first direction.

12. A multilayer ceramic capacitor comprising:
a ceramic body having a plurality of first internal electrodes and a plurality of second internal electrodes that are alternately stacked in a third direction with dielectric layers disposed therebetween, wherein the ceramic body has a length L in a first direction orthogonal to the third direction greater than a width W thereof in a second direction orthogonal to the first and third directions, and the first and second internal electrodes are each respectively exposed to third and fourth surfaces opposite each other in the second direction; and
first and second external electrodes respectively disposed on the third and fourth surfaces to respectively connect to the plurality of first internal electrodes and to the plurality of second internal electrodes,
wherein the first external electrode comprises a first electrode portion disposed on the third surface of the ceramic body and a first band portion extending onto at least one of the first and second surfaces of the ceramic body opposite each other in the third direction,
the second external electrode comprises a second electrode portion disposed on the fourth surface of the ceramic body and a second band portion extending onto at least one of the first and second surfaces of the ceramic body, and
a width of the first or second band portion in the second direction is SW, and a ratio SW/W exceeds 0.11 and is less than 0.46, and
a length of the first and second electrode portions in the first direction is BW, and a ratio BW/L is less than 1.00.

13. The multilayer ceramic capacitor of claim 12, wherein the first band portion extends onto both of the first and second surfaces of the ceramic body, and the width SW of the first band portion on each of the first and second surfaces satisfies the ratio SW/W exceeding 0.11 and being less than 0.46.

14. The multilayer ceramic capacitor of claim 12, wherein a the ratio BW/L exceeds 0.10.

15. The multilayer ceramic capacitor of claim 12, wherein the ratio BW/L is less than 0.90.

16. The multilayer ceramic capacitor of claim 12, wherein each of the first and second internal electrodes comprises a capacitance portion overlapping with a neighboring internal electrode to contribute to capacitance formation and a lead-out portion extending from the capacitance portion to be led-out to an outside of the ceramic body.

17. The multilayer ceramic capacitor of claim 16, wherein the capacitance portion is spaced apart from the third and fourth surfaces of the ceramic body by a distance smaller than the width SW of the first or second band portion in the second direction.

* * * * *